Nov. 24, 1970   G. W. RAYE ET AL   3,543,035
APPARATUS FOR REMOVING DEFECTIVE AREAS FROM MATERIALS
INCLUDING SCANNING MATERIALS WITH PHOTOCELL
HAVING TWO SECTIONS
Filed March 9, 1966   10 Sheets-Sheet 1
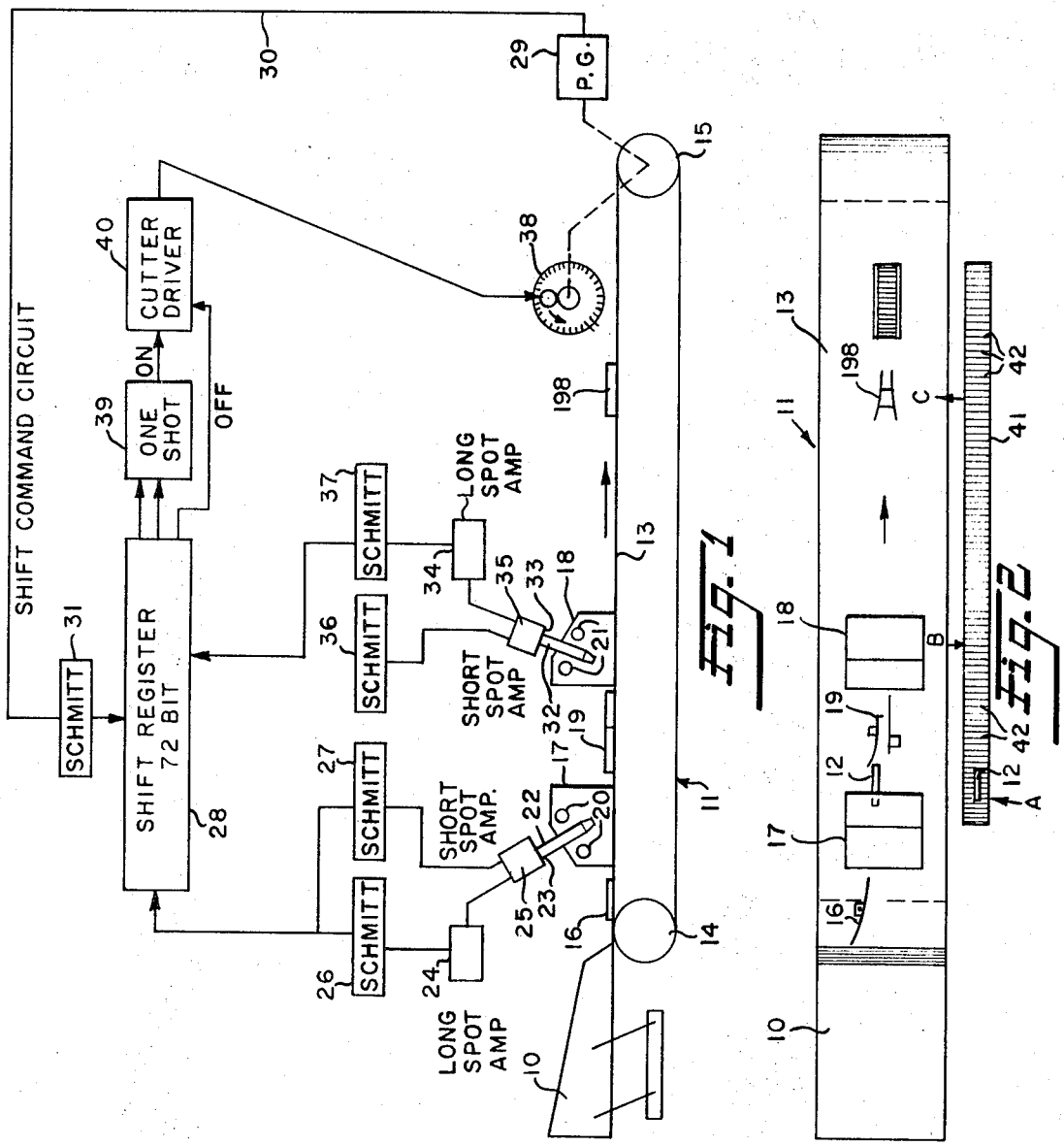
INVENTORS
GEORGE W. RAYE
HENRY J. DUMAS, Jr.
LLOYD N. DUNCAN
BY Cameron, Kerkam & Sutton
ATTORNEYS INVENTORS
GEORGE W. RAYE
HENRY J. DUMAS, Jr.
LLOYD N. DUNCAN BY Cameron, Kerkam + Sutton
ATTORNEYS

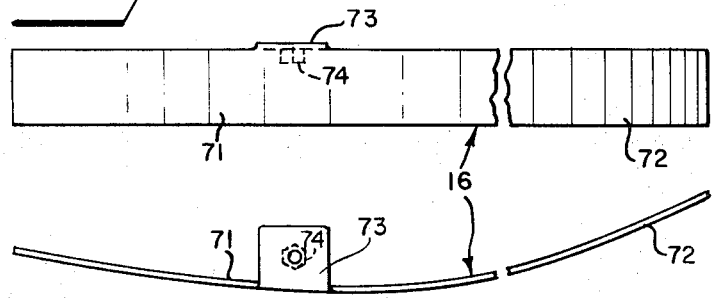
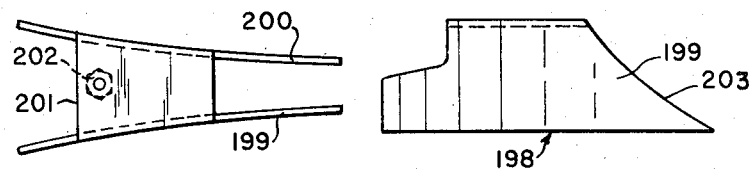
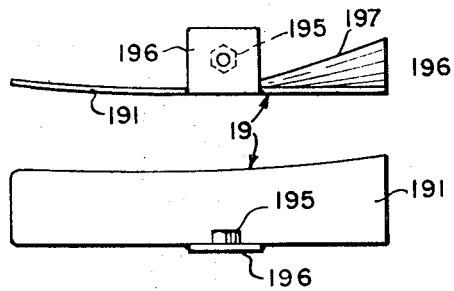
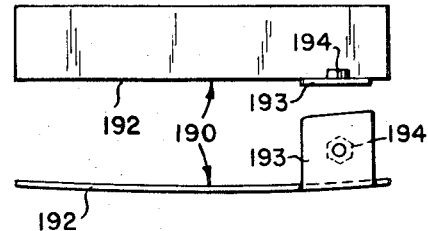

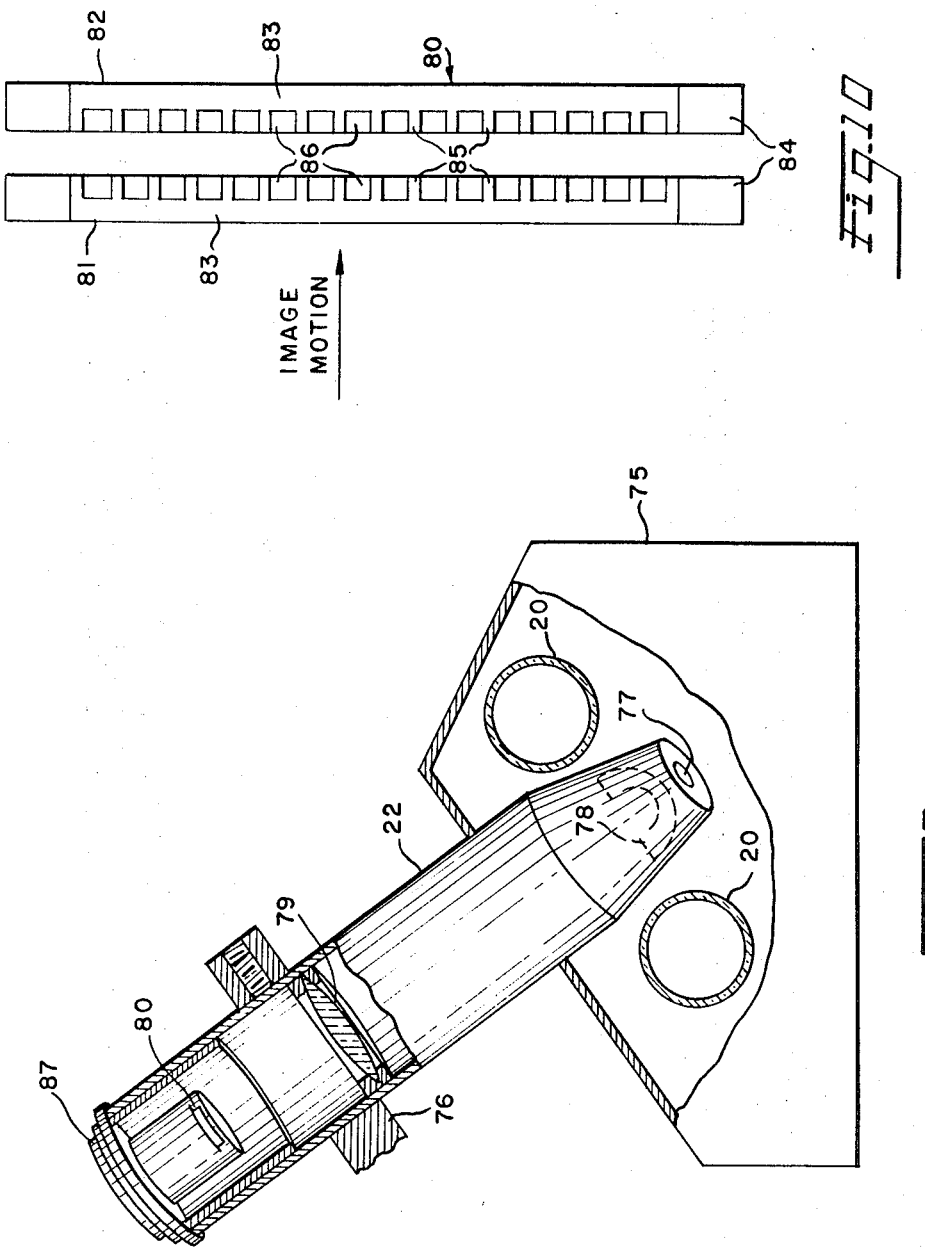

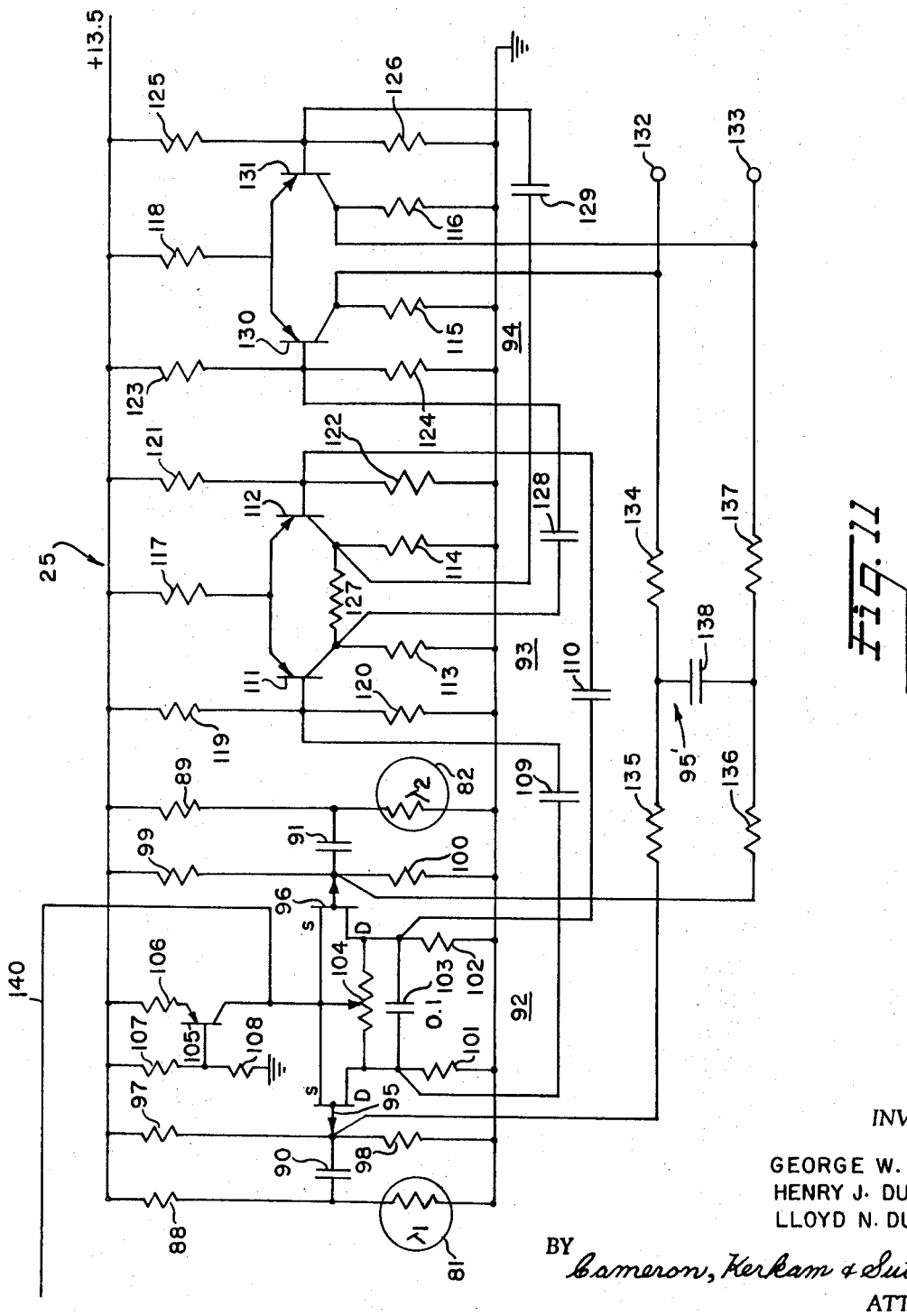

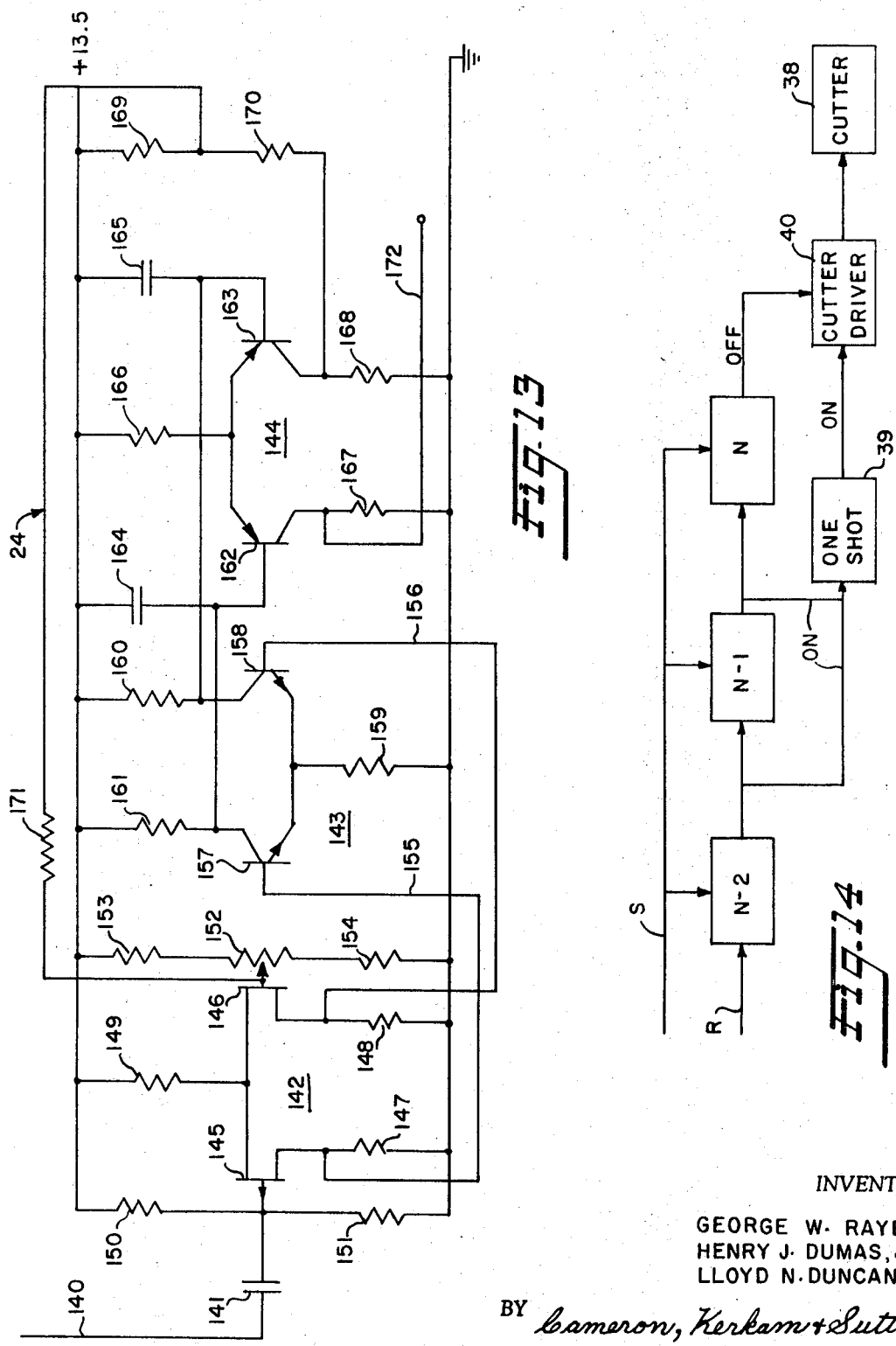

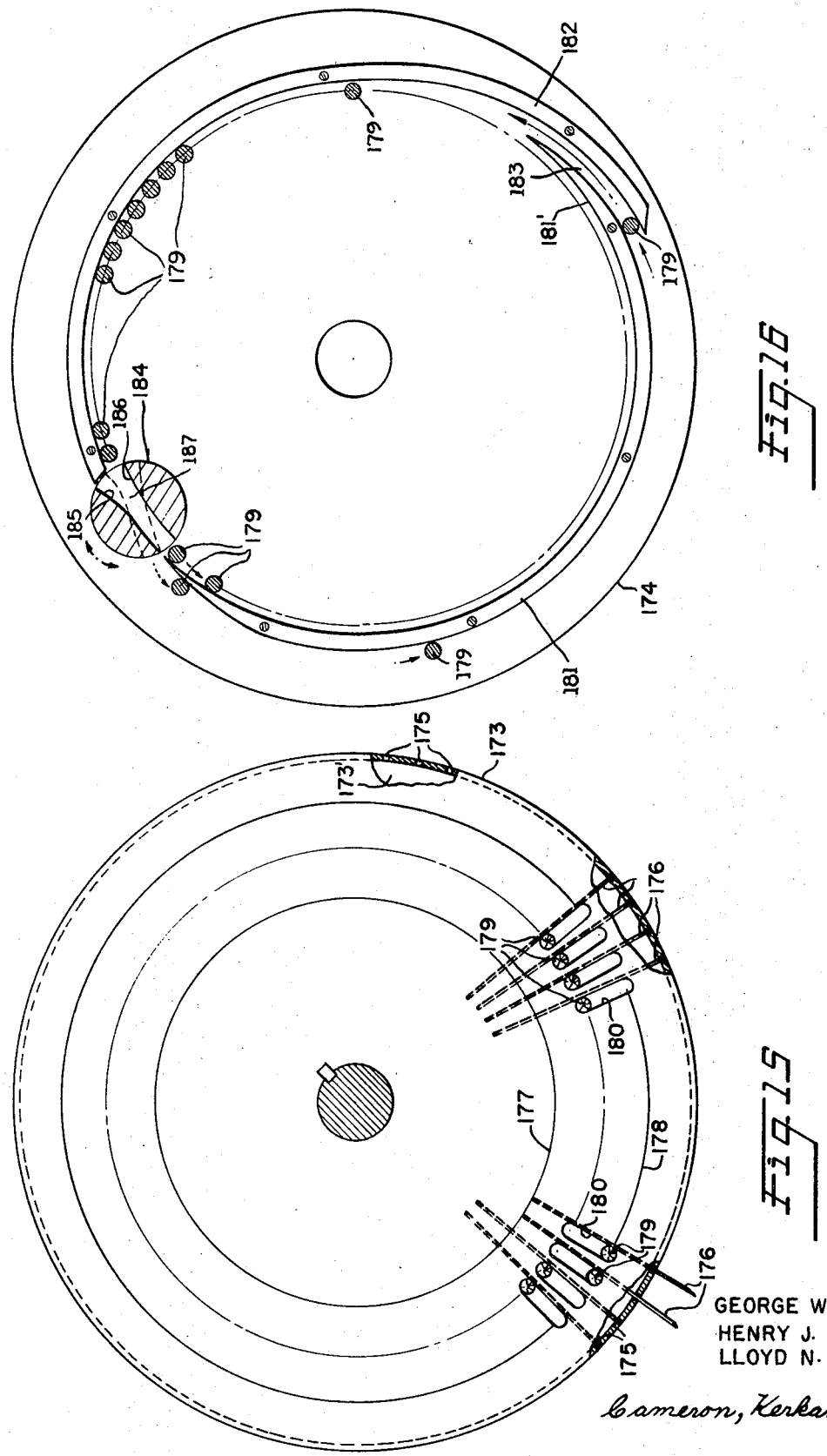

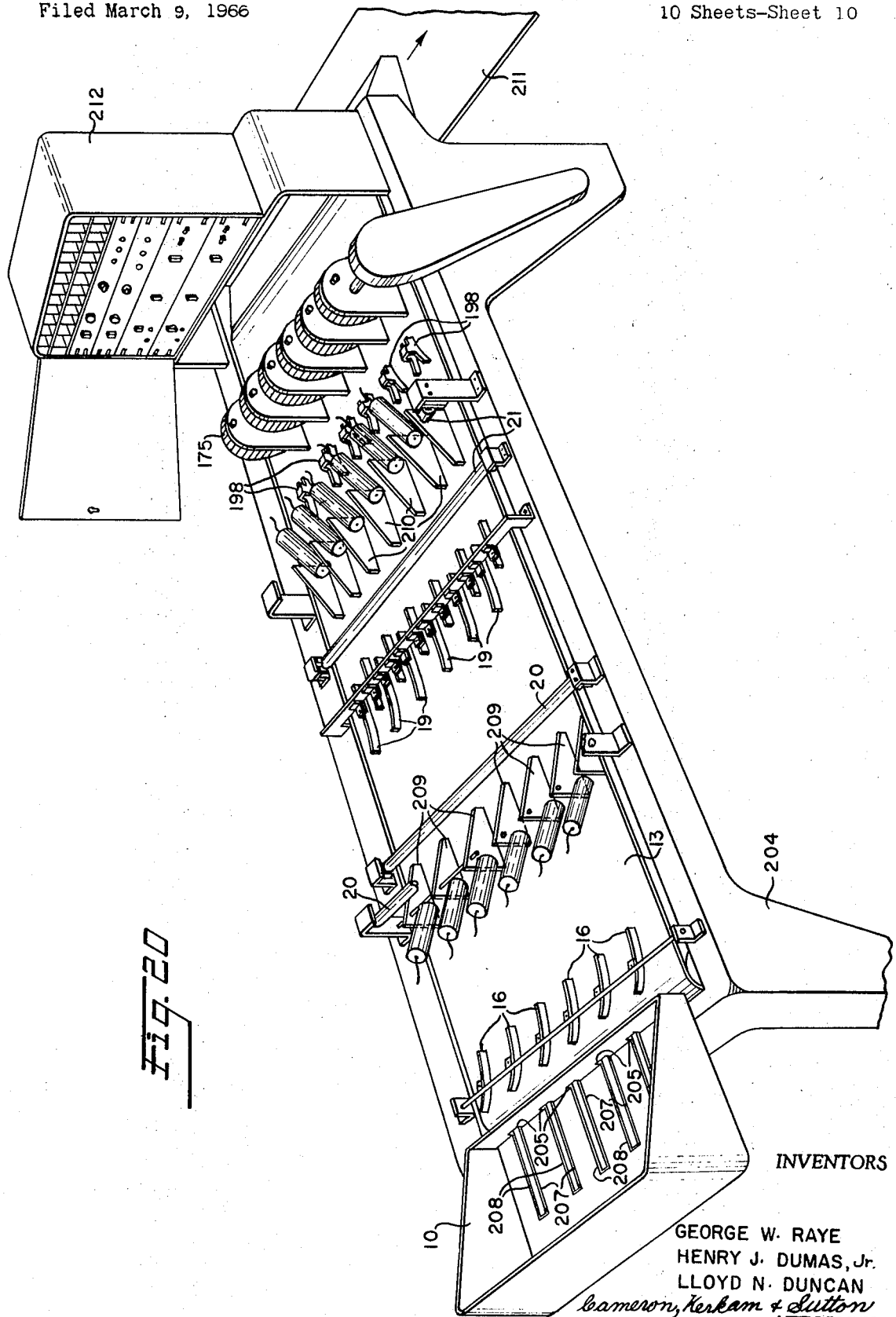

United States Patent Office 3,543,035
Patented Nov. 24, 1970

3,543,035
APPARATUS FOR REMOVING DEFECTIVE AREAS FROM MATERIALS INCLUDING SCANNING MATERIALS WITH PHOTOCELL HAVING TWO SECTIONS
George W. Raye, Noroton, Conn., Henry J. Dumas, Jr., Framingham, Mass., and Lloyd N. Duncan, Caribou, Maine, assignors, by mesne assignments, to American Kitchen Foods, Inc., Greenwich, Conn., a corporation of Delaware
Filed Mar. 9, 1966, Ser. No. 533,037
Int. Cl. G01n 21/16
U.S. Cl. 250—223
28 Claims

ABSTRACT OF THE DISCLOSURE

Apparatus is provided for inspection of strip-like articles and removal of defects present thereon. The individual articles are transported along a belt conveyor and caused to pass under two spaced electro-optical viewing arrangements. Each article is turned over as it travels from one viewing station to the other so that all sides are exposed. A moving image of each article is projected on a photoconductive cell having series arranged elements to provide small spot detection on a differential basis and large spot detection on a parallel or average basis. The outputs of the photocells are used to control actuation of a cutter for separating from each article portions of the articles having defects thereon.

BACKGROUND OF THE INVENTION

Inasmuch as the invention is especially well adapted for embodiment in a potato processing plant in connection with the processing of sliced potatoes to be used for frozen french fries, the following description will be directed primarily to this specific application of the inventive concept. By so doing, however, it is not intended to limit the scope of the invention or its application.

In the processing of potatoes to be used for frozen french fries, a large proportion of the labor required is used in trimming the potatoes after they have been peeled and before they have been cut into strips. The trimming is necessary to remove the eyes, blemishes, diseased portions and bits of peeling which are not completely removed by the peeling process and which destroy the savory appearance of the strips. The advantages of automating the trimming operation and the attendant cost savings have long been recognized; however attempts to automate this stage of processing, particularly through the use of optical detecting arrangements, for one reason or another, have not proved entirely satisfactory.

For example, one attempt for processing strip-like materials proposes the use of a strip sorter which includes an optical system for viewing individual strips as they are carried along a conveying belt and measuring the over-all light change in a scanning slit. Where the over-all light change exceeds a standard value, the strip is rejected and removed from the conveyor. Since the change in over-all light value for a tiny defect causing a shade or color variation, for example, on the order of less than ¼ inch is small, it becomes difficult to distinguish between the signal corresponding to the defect and that due to light source modulation, differences between background reflection and that of the strip being inspected and normal reflectance variations of the strips. Consequently such an arrangement is suitable only where large defects are present.

Other known optical systems for measuring over-all light change to detect defects in strip materials also suffer from the disadvantage that the sensitivity of the optical system limits the minimum size of the defects that can be effectively detected. Attempts to provide a scanning system which inspects only a very small area of a strip at any one instant have not met with such success, since such scanning reduces considerably the time available for the optical system to respond and introduces light variation problems which in turn limit the resolution of the system and add complexity to the structural arrangement as well as additional logic circuitry to the electrical control system.

SUMMARY OF THE INVENTION

These and other disadvantages of the prior art are overcome by the present invention which has as its primary object the provision of an improved apparatus and method for automatically inspecting and detecting irregularities in strip-like materials and selectively processing the materials on which the irregularities occur.

Another object of the present invention is to provide an improved apparatus and method for inspecting, detecting and removing irregularities from strip-like materials, all of these functions being performed efficiently, automatically and with the reliability and accuracy needed to maintain established quality control standards.

In the processing of food strips such as, for example, potato strips to be used for french fries, defects appearing on the individual strips after the potatoes have been peeled and cut into strips generally are distributed in a random pattern, i.e., they are of varying size and do not occur in any particular position of the strip. Consequently it is a further object of the present invention to provide an improved apparatus and method for processing food strips having defects of varying size and selectively removing the portion or portions of the strip which are defective.

Yet another object of the present invention is to provide an improved apparatus and method for the automatic inspection and removal of defects from peeled and pre-cut food strips.

Still another object of the present invention is to provide an improved food inspection and defect removal apparatus and method which removes defects from food strips with a minimum amount of waste.

The automatic inspection and detection of defects or irregularities in strip-like materials requires that the materials be conveyed past the operating stations, generally by means of a belt conveyor and some means must be provided to enable the inspection of that side of each strip which rests on the conveyor belt. Further, provision must be made for inspecting the leading and trailing edges of each strip where defects may also occur. Accordingly, it is another object of the present invention to provide an improved optical inspection apparatus and method for inspecting and detecting defects on all sides of strip-like materials carried on a conveyor belt or the like.

Another object of the present invention is to provide an improved electro-optical inspection apparatus and method for comparing reflected light from one area of a strip with light reflected from another area of the same strip.

A further object of the present invention is to provide an improved optical inspection apparatus which is highly sensitive and capable of detecting minute defects or irregularities.

Still another object of the present invention is to provide an improved optical inspection apparatus which is highly sensitive and minimizes ambient background and shadow noise.

Yet another object of the present invention is to provide an improved electro-optical processing apparatus and method for processing strip-like materials according to shade or color variations thereon.

To this end, one embodiment of the present invention comprises a feeding station wherein the materials to be processed which may be, for example, raw potato strips to be packaged as french fries, are delivered and aligned in their lengthwise direction on a conveyor belt. As the belt is driven, it carries each strip past an inspection station comprising a pair of electro-optical viewing assemblies, each of which generates a signal responsive to any defect which may be on the strip. Between each viewing assembly, each strip is flipped over 90° so that all sides are viewed. Signals generated at the inspection station are electronically stored and serve to energize a cutter which is positioned at a remote location along the conveyor belt to cut out a section of each strip containing the defect as it reaches the cutting station.

In accordance with one feature of the invention, the strips to be processed are pre-positioned on the conveyor belt so that at least one flat side rests on the belt and the strips travel with their long axis in the direction of motion. A first optical assembly projects an image of each strip on the elements of a photocell and is positioned to look at two longitudinal sides and one end of each strip simultaneously. A second optical assembly views the other two sides of the strip and the other end of each strip after its inspection by the first optical system. A system of plows for turning the strips 90° around their longitudinal axis is disposed between the first and the second optical assemblies.

In accordance with another feature of the present invention, the sensing or inspection assemblies consist of a telescope for projecting the image of the strip onto a differential photo-conductive cell consisting of two sections of photo-conductive material susceptible to a wide change in resistance between the two sections when the image of a defect appears on one-half of the cell and not the other. Each section of the cell forms an opposite arm or leg of a bridge circuit connected to provide a voltage dependent on the change in resistance of the two sections of the cell. Small or short spot detection, i.e., in the case of potato strips detection of defects less than ¼ inch in diameter is effected by differential detection, while large or long spot detection is effected by the average change of resistance of the cell.

In accordance with another feature of the invention, there is provided a cutting wheel having normally retracted cutting blades spaced around its periphery and arranged to be projected in response to a command signal for engaging the strips on each side of a small irregularity or in the case of a large irregularity cutting the entire strip into cubes. Each irregularity or defect sensed at an inspection station causes a defect signal to be generated which is stored in a register and shifted for predetermined increments of belt travel to synchronize the cutter and storage system independently of belt speed. After a predetermined amount of belt travel, the register delivers one or more command signals corresponding to the stored defect signals to trigger the cutter.

Other features and advantages of the present invention will be readily apparent from the following description. While the specification concludes with claims particularly pointing out and distinctly claiming the subject matter of the present invention, the invention will be more clearly understood from the following detailed description taken in connection with the accompanying drawings; however, it is to be expressly understood that the drawings are for the purpose of illustration only and are not intended to represent the full scope of the invention which is defined by the appended claims.

BRIEF DESCRIPTION OF THE DRAWINGS

In the drawings, wherein like characters refer to like parts throughout the several views:

FIG. 1 is diagrammatic and block diagram illustration of the present invention;

FIG. 2 is a diagrammatic plan view of the several operating stations of the present invention;

FIGS. 7 and 8 show the details of a strip positioning guide member;

FIG. 9 shows the details of the electro-optical assembly, while FIG. 10 shows the details of the photoconductive cell;

FIG. 11 illustrates schematically the details of the bridge circuit and small spot amplifier of the present invention, while

FIG. 13 illustrates schematically the details of the large spot amplifier of the present invention;

FIG. 14 is a block diagram illustrating the output logic for actuating the cutter;

FIGS. 15 and 16 are side elevational views of the rotary cutter.

FIGS. 17A–17C, 18A–18B, and 19A–19B show the details of the turn-over guides and final positioning guides; and FIG. 20 is a diagrammatic, perspective view of an alternate embodiment of the present invention.

DESCRIPTION OF THE PREFERRED EMBODIMENTS

Figure 3:
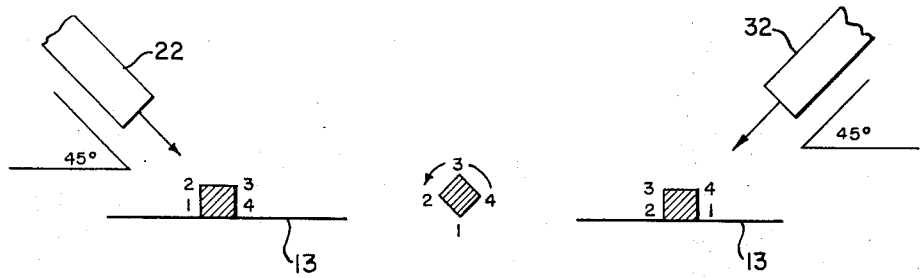
FIGS. 3 and 4 illustrate the angle of view of each optical assembly.
Figure 4:
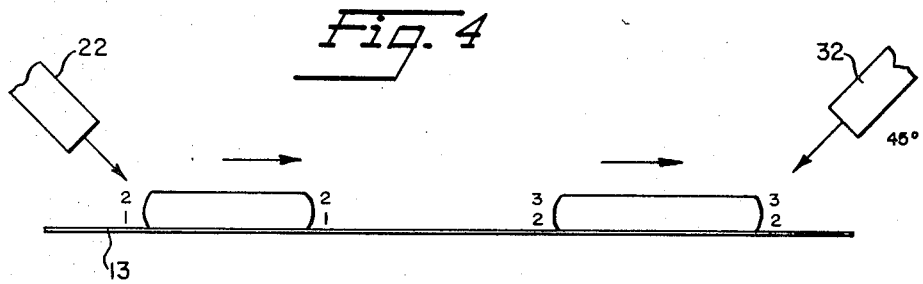

Before proceeding with a detailed description of the structure of the apparatus and its component parts, the invention will first be described in connection with FIGS. 1–4 which illustrate diagrammatically the several operating stations and the operating sequence for detecting and removing a defect. As shown in FIG. 1, a feed hopper designated generally by the reference character 10 contains a supply of strip-like materials to be processed which may be sponges, pads, component parts, food strips and the like which have been prepared for processing in a conventional manner. The strips from the feed hopper are dropped between parallel guide bars and aligned in their lengthwise position for delivery to a conveyor 11 which carries the individual strips, designated by reference character 12, past the operating stations which includes a first alignment station, a first viewing or inspection station, a turn-over station, a second viewing or inspection station, a second alignment station and a processing station.

Conveyor 11 comprises endless belt 13 extending around pulleys 14 and 15, one of which is driven in a conventional manner by a drive motor (not shown). Advantageously, belt 13 has a textured surface to minimize accidental shifting of the strips 12 as they are delivered from the feed hopper to the conveyor belt and carried therealong and to prevent slipping when the strips are turned over.

The strips 12 are received on the conveyor 11 one behind another and carried by the belt 13 to a positioning station where the individual strips are aligned by guide member 16 in the event that the strip has not been pre-positioned exactly in its lengthwise direction by the guide bars of feed hopper 10 or has been shifted slightly from its lengthwise direction.

If the strip has a square or rectangular cross-section, the guide member 16 merely aligns the strip properly for inspection by the electro-optical assemblies 17 and 18. However, since strips are occasionally other than square or rectangular in cross-section and often consist of two sides extending at 90° angles with respect to a third curved intermediate side which would cause the strip to wobble as it is moved, the guide member 16 is advantageously adapted to position the strip onto one of its flat sides to avoid this instability and cause the curved exterior surface, where in some cases most defects are likely to appear, to be exposed for inspection by the first electro-optical assembly.

Continued travel of the belt 13 causes each strip to be successively conveyed past the inspection stations which include a first and a second electro-optical assembly 17 and 18, respectively, disposed on opposite sides of a turnover assembly 19. The first electro-optical assembly 17 views sides 1–2 and 2–3 and the trailing edge of each strip, as more clearly shown in FIGS. 3 and 4. All visible sides of each strip are illuminated as they pass through each electro-optical assembly by a pair of cool-white fluorescent lamps 20 and 21. As a further precaution against shadows and to make optimum use of available illumination, the conveyor belt is similar in color to that of the strips or may be slightly lighter.

The first electro-optical assembly 17 includes a telescope 22 which projects an image of each strip on the sensitive elements of a photo-cell assembly 23. If there are no blemishes or defects on the strip, there will be very little change in light value as the projected image crosses the sensitive elements of the photo-cell assembly; however, if there is a dark spot, the dark spot causes a change in light value and an electrical signal is generated which is amplified by one of amplifiers 24 or 25, depending on whether the spot is large or small. The amplified signal from amplifier 24 or 25 is fed to a conventional Schmitt trigger 26 or 27, respectively, which provides level selection and pulse shaping. The shaped output signal of the Schmitt trigger is in turn transmitted to the first stage or memory cell of a shift register 28 where the signal is stored and read out in response to a shift command pulse received from pulse generator (P.G.) 29 and transmitted through line 30 and shaped by Schmitt trigger 31.

After passing the first viewing station, each strip 12 continues its travel and comes in contact with a flipper or plow 19 which flips or turns the strip 90° to cause the strip to be carried on its adjacent side, thus exposing sides 3–4 and 4–1 and the leading edge to the second electro-optical assembly 18. The electro-optical assembly 18 and the amplifying and level selection circuits of the second viewing station are identical to the corresponding components of the first viewing station and include telescope 32, photocell assembly 33, long spot amplifier 34, short spot amplifier 35 and Schmitt triggers 37 and 36, respectively.

The second viewing station may detect a defect different from that detected by the first viewing station, in which case it will cause a signal to be put into the shift register as before, but in a different position corresponding to the distance the strip 12 has traveled on the belt 13 past the first viewing station. The second viewing station may also detect a defect which occurs on a different side but corresponding cross-wise to the position of a defect detected in the first viewing station. This might occur, for example, when a spot extends across the corner formed by sides 2–3 and 3–4. In this case, the signal from the second viewing station would be applied on top of the previous signal, that is, to the same memory cell to which the previous signal has been advanced and stored. However, since this cell has already been energized to store a signal corresponding to a defect in the strip at that position, no further separate action results due to the duplicating signal from the second viewing station.

As the strip passes a certain point ahead of where it is to be acted on at the processing station by the rotary cutter 38, the outputs of the last three memory cells of the shift register 28 are read out. The output of the third from last memory cell (N–2) is translated to a one-shot multivibrator 39, and the output of the one-shot multivibrator establishes the ON command to the cutter driver 40 which, in turn, operates the solenoid in the rotary cutter so as to cause one of the blades to be extended in response to rotary action of the cutter. The output of (N–1) is also fed to the multivibrator to give a successive ON command causing a second blade to be extended. The cutter driver 40 remains energized in the blade extending position until an OFF command from the last memory cell (N) is received, and once the cutter driver is triggered, the full extension of the blades is assured mechanically. A minimum of two extended blades is necessary to cut out a single defect, and the return of the solenoid to its deenergized condition prevents extension of more than two blades for a single defect signal under control of the OFF command signal from the last memory cell to the cutter driver.

Although the output of the last memory cell normally inactivates the solenoid, if another defect should occur which would cause a signal to be stored in the second (N–1) or third (N–2) from last memory cell at the time an OFF command is received, an ON command signal is concurrently translated to the cutter driver. This ON command signal is received a short interval of time after the OFF command signal due to the time delay provided by one-shot multivibrator 39 and there being insufficient time for the inactivation of the solenoid, the solenoid remains energized. Depending on the length of time the solenoid remains energized, one or more additional cutter blades are caused to be extended so as to operate on subsequent defects. Blade synchronization is effected by the direct drive connection between rotary cutter 38 and pulley 15, and the shift command pulses applied to the shift register from pulse generator 29.

It should be apparent that rotary cutter 38 effects only one form of operation which may be performed and that the output of the shift register may be utilized to energize other control devices such as, for example, an ejecting mechanism to eject defective strips or an indicator to provide a visual or audible alarm or count of the number of defects. The latter arrangement particularly enables the maintenance of high quality control standards by providing an immediate indication of a bad batch of supply materials.

Referring to FIG. 2, there is illustrated at 41 a diagrammatic illustration of the theoretical cutting lines 42. The shift register 28 in effect provides a memory cell for every possible cut-out between the first viewing station and the point at which the cutting trigger signal is generated. A signal corresponding to a defect detected at the first viewing station is entered into the first memory cell of the shift register at A and is passed from one memory cell to another at the identical rate that a strip 12 moves toward the cutting wheel 38 by shift pulses from the pulse generator 39 which provides an output pulse for each predetermined increment of belt travel. If a defect is detected at the second viewing station, a corresponding signal is entered in a memory cell at B and also passed through successive cells. Signals stored in the memory cells corresponding to point C are read out and translated to the output logic circuits to actuate the cutting blades.

The logic is such that at least two blades will be extended by any single defect whereby a section of predetermined minimum length may be removed from the strip. A defect occurring anywhere within the minimum length section is cut-out by one pair of blades and the position of the defect is immaterial. Where the defect is longer than said minimum length, three or more blades are actuated. The positions for cutting are predetermined when the strip 12 is placed on the belt 13. If the defect happens to lie half-way between the predetermined cutting points 42, two blades are extended; however, if a defect occurs on a theoretical cutting line, 3 blades will be actuated, and if the defect extends the entire length of the strip 12, a sufficient number of blades will be actuated to dice the strip.

Figure 5:
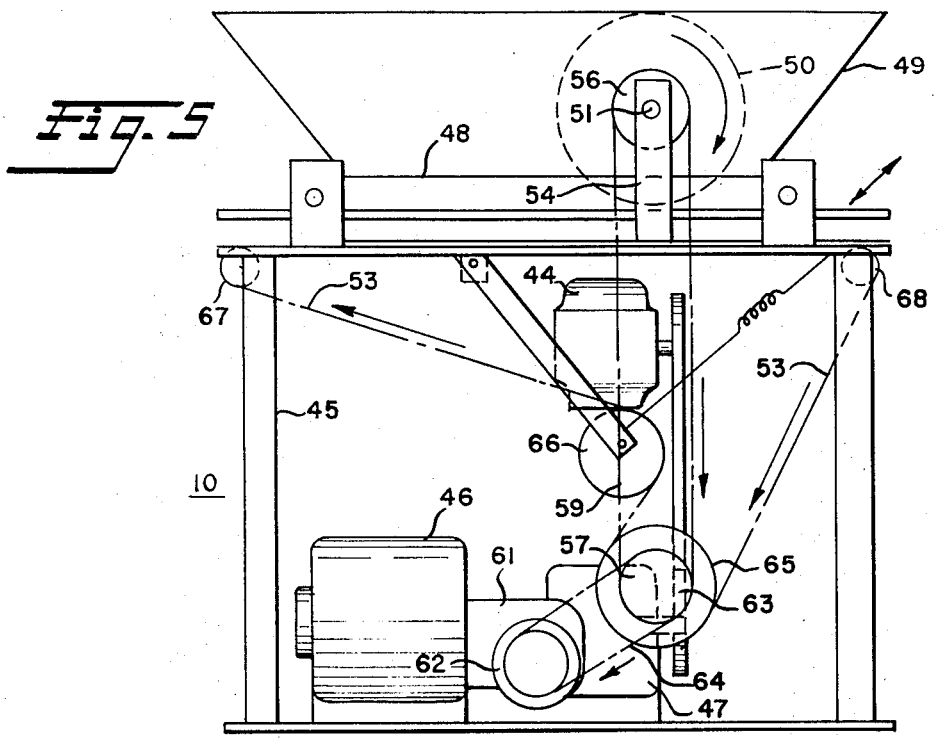
FIGS. 5 and 6 are side elevational and front views, respectively, of a feed hopper suitable for use with the present invention.
Figure 6:
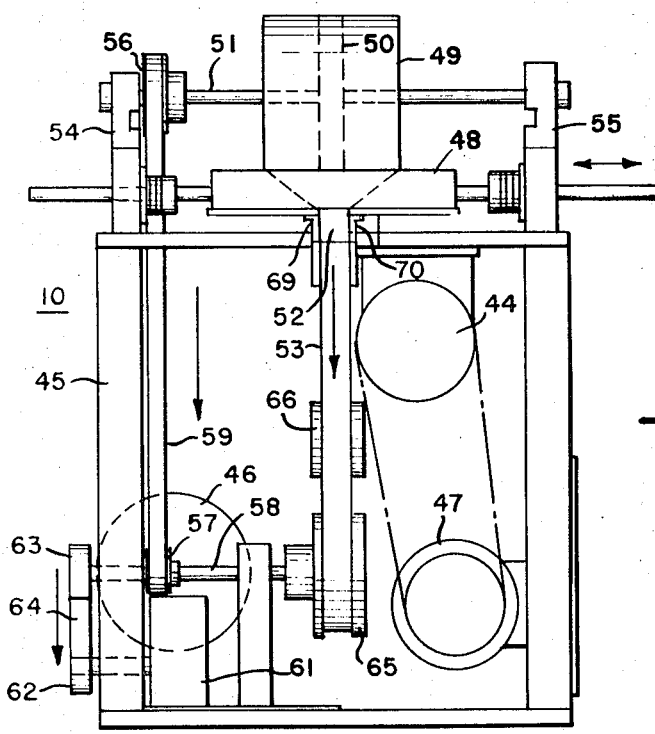

The feed hopper 10 may comprise any suitable arrangement for delivering strips 12 to the conveyor belt 13 in a single row, with the strips aligned generally in a lengthwise direction. For the purpose of illustration, one form of feed hopper suitable for use with the present invention is illustrated in FIGS. 5 and 6.

Feed hopper 10 comprises a main frame 45 which supports a feed belt drive motor 46, a vibrator drive motor 47, a vibrator unit 44, a shaker table 48 and a funnel 49. Shaker table 48 provides a conventional arrangement for mixing the contents in funnel 49 and is driven in the direction of the arrows in a manner well known in the art by vibrator unit 44 connected to vibrator drive motor 47 through a conventional belt drive.

Funnel 49 is secured to the shaker table 48 and has disposed therein a distributing brush 50 rotatably supported by shaft 51 above an opening 52 through which strips are dropped onto endless belt 53. Shaft 51 is journaled at opposite ends to vertical supports 54 and 55 secured to main frame 45 and is driven by pulley 56 connected to drive pulley 57 on shaft 58 by belt 59. Shaft 58 is driven from drive motor 46 through a reduction gear unit 61 and a belt drive comprising pulleys 62 and 63 connected by belt 64. Shaft 58 also has supported thereto a drive pulley 65 for driving endless belt 53 which extends from pulley 65, in the direction of belt travel, upwardly and around idler pulley 66, around and over rollers 67 and 68 below opening 52 to receive the strips which fall through the opening. Channel guides 69 and 70 disposed on opposite sides of opening 52 provide pre-alignment of the strips in their lengthwise direction prior to delivery to the conveyor belt 13.

As hereinbefore described, strips delivered to the conveyor are aligned by guide member 16 prior to being conveyed to the inspection station to insure that each strip 12 passes within the field of view of each telescope 22 and 23 and that each strip is positioned on a flat side. To this end, as shown in FIGS. 7 and 8, guide member 16 comprises a flat plate 71 having a gradual bow over a greater portion of its length with a trailing edge 72. A lip 73 extends at right angles to plate 71 and is provided with a threaded boss 74 for securing the guide member above belt 13 to a transverse cross-piece (not shown).

Guide member 16 is angularly positioned with respect to an incoming strip 12 to cause the strip to strike the leading edge of the plate 71. The continuing travel of the belt 13 first causes the strip to be displaced transversely so that its long side rests against plate 71 and, if the bottom surface is curved, to be turned over on a flat side. As the strip passes the bowed portion of the guide member, it will be shifted back or returned to its original lengthwise orientation adjacent the trailing edge 72 so that its axis coincides with the direction of belt travel. Advantageously, the guide member is Teflon coated to provide minimum friction and to prevent residue build-up.

Each electro-optical assembly 17 and 18 is identical in construction with the exception that assembly 17 is supported above belt 13 to view sides 1–2 and 2–3, while assembly 18 is supported above belt 13 to view sides 3–4 and 4–1 as hereinbefore described. Accordingly, for convenience, the details of only one electro-optical assembly will be described.

Referring to FIG. 9, each assembly comprises a housing 75 having suitable means for illuminating the strips as they are carried therethrough. Advantageously, a pair of cool-white fluorescent lamps, diagrammatically illustrated at 20, are supported transversely within the housing with respect to belt 13 and on opposite sides of telescope 22 for lighting the passing strips to minimize shadows on the sides and the ends of the strips. The use of cool-white fluorescent lamps provides an optimum spectrum response of reflected light, particularly from fresh-cut potato slices. Telescope 22 is mounted on gimbal 76 and has its optical axis disposed preferably at an angle of 45° with respect to a vertical plane whose axis corresponds with the longitudinal axis of the strips carried on belt 13 and at an angle of 45° with respect to a vertical plane normal to the direction of travel of the strips, thus viewing two sides and one end of each strip as it passes the viewing station.

Each strip is viewed through opening 77 and an image of the strip is projected through a conventional lens system comprising field stop 78 and lens 79 which projects an illuminated image on the face of a differential-type photo-conductive cell 80. Photo-conductive cell 80 is connected in a bridge circuit of the photo-electric assembly 23 and provides output signals in response to relative changes in resistance values of the light sensitive elements of the photo-conductive cell. In a manner well known in the art, telescope 22 is provided with suitable field stops 78 to enhance image contrast by reduction of stray light.

Referring to FIG. 10, each photo-conductive cell 80 consists of two sections 81 and 82, each section being formed from a sintered CdS block 83 having an Al vacuum deposited metal pattern 84. The metalized conducing pattern formed by the deposited Al breaks up adjacent edges of each section to form a comb-like structure having alternately spaced active high resistance areas 85 of CdS and low resistance conductive areas 86 of Al which in effect provide a large number of series connected high resistance cells in each of the two sections 81 and 82. Al metal flashing is utilized to reduce end-to-end resistance of each section while maintaining sufficient resolution for detection of a dark spot having a diameter of approximately $\frac{1}{16}''$. In this manner, the photo-conductive cell is susceptible to a wide change in resistance between the two sections when an image of a shadow covers a high resistance cell of one section and not one of the other sections.

Each section of the photo-conductive cell is connected in opposite arms of a balanced bridge circuit which provides an output signal to the short spot amplifier 25 in response to differential detection, that is, the difference in resistance value of each section, and an output signal to the long spot amplifier 24 in response to the average resistance value of both sections of the photo-conductive cell. Advantageously, each amplifier may be pre-assembled in a well known manner on printed circuit boards or cards and the photoconductive cell 80 and short-spot amplifier 25 may be package mounted on the telescope as at 87. Electrical connections to the end sections of the metalized conductive pattern are made in a conventional manner with conductive epoxy.

Referring to FIG. 11, the bridge circuit comprises resistors 88 and 89 serially connected to sections 81 and 82, respectively, of photo-conductive cell 80. The junction of resistor 88 and photo-conductive cell section 81 and the junction of resistor 89 and the photo-conductive cell section 82 are individually coupled through capacitors 90 and 91 to the balanced differential amplifier stage 92 of the short spot amplifier 25. Short spot amplifier 25 is a high gain, A.C. coupled differential amplifier comprising three stages 92, 93, and 94. Stage 92 has high common mode rejection to reduce 120 cycle modulation introduced due to the use of fluorescent tubes operating on 60 cycles, and the following stages provide voltage gain for the differential signal which is amplified by each stage, while R.C. network 95' provides negative feedback for stabilization and differentiation of the input signal.

The input differential stage 92 consists of a pair of matched field effect transistors 95 and 96 each having their gate electrode connected to the junctions of series connected resistors 97, 98 and 99, 100 which are, in turn, connected at opposite ends to the positive supply buss and ground. The drain electrode of each transistor 95 and 96 is returned to ground through resistors 101 and 102 and coupled together by feedback phase-correcting capacitor 103 and balance adjust potentiometer 104. The movable arm of potentiometer 104 is connected to a common junction between the source electrodes of transistors 95 and 96 and returned to the positive supply buss through a current source formed by transistor 105. Transistor 105 is biased in a conventional manner through resistors 106, 107, and 108 to provide a constant current source which enhances common made rejection and accentuates any dynamic unbalance in the first stage.

The differential output signal from the first stage resulting from an input differential signal is taken across the drain electrodes and coupled through capacitors 109 and 110 to the base electrodes of transistors 111 and 112, respectively, forming the second differential amplifying stage. The second and third stages of the short spot amplifier are conventional differential amplifying circuits biased to provide voltage gain.

To this end, the collectors of each transistor are returned to ground through resistors 113–116 and the emitters of each stage are connected to the positive supply buss through common emitter resistors 117 and 118. The signal input from each preceding stage is applied across opposite base electrodes of a stage connected to the junction of resistors 119, 120; 121, 122; 123, 124, and 125, 126. Resistor 127 connected between the collectors of transistor 111 and 112 of the second stage 93 serves to control loop gain.

The differential output signal from the second stage is taken across the collectors of transistors 111 and 112 and coupled through capacitors 128 and 129 to the base electrodes of transistors 130, 131, respectively, which in turn have their output taken from their collectors and applied to terminals 132 and 133. R.C. network 95 comprising resistors 134, 135, 136, 137 and capacitor 138 is connected in a feed back path between the collector electrodes of the third stage 94 and the signal input electrodes of the first stage 92 to provide a differentiating action. The effectiveness of the differentiating action may be demonstrated by reference to FIGS. 12A–12D.

Figure 12A:
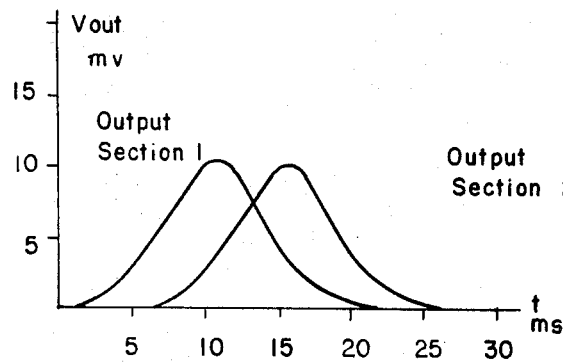
FIGS. 12A–12C are voltage output curves illustrating the differentiating action of the circuit shown in FIG. 11.

FIG. 12A illustrates a comparison of the voltage output across each section 81 and 82 of the photo-conductive cell with the conveyor belt 13 traveling at a belt speed of 150 feet per minute and an image of a strip projected having a ⅛-inch diameter dark spot with 0.4 magnification. A voltage output is generated by a dark spot from each section of the photo-conductive cell due to a change in value of its resistance and is applied to the corresponding field effect transistors 95 and 96 through coupling capacitors 90 and 91.

The voltage output generated by a ⅛-inch diameter dark spot is approximately 10 millivolts and is applied to the corresponding field effect transistor through coupling capacitors 90 and 91. The peak of the output of each voltage pulse is separated by approximately 5 milliseconds with a spacing between photo-conductive cell sections of ½₂ of an inch.

Figure 12B:
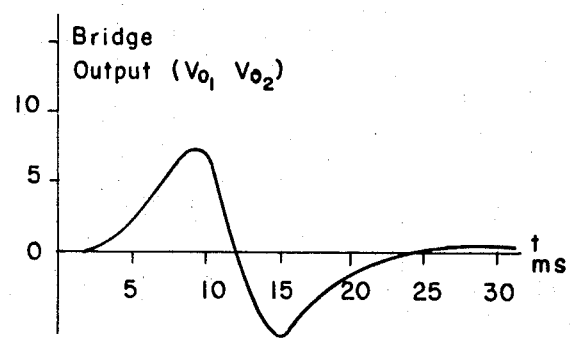
Figure 12C:
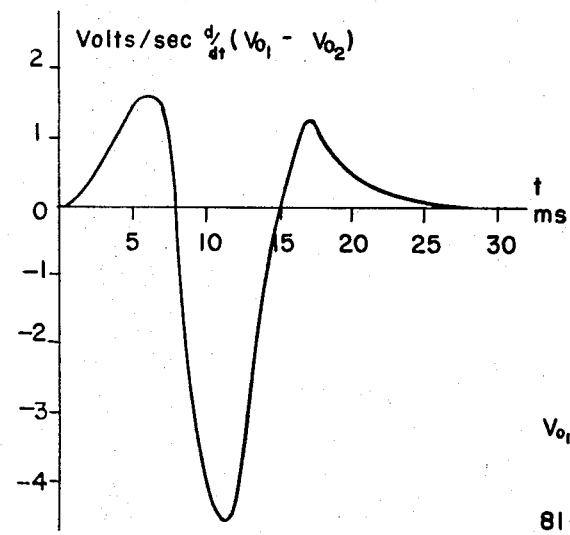
Figure 12D:
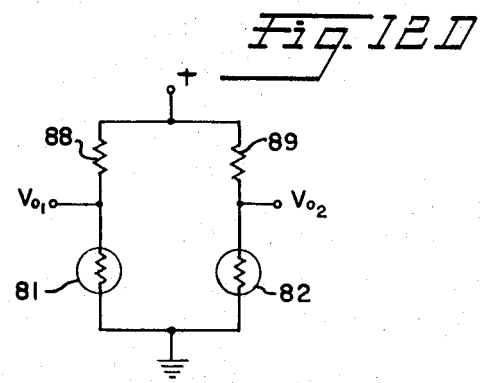
FIG. 12D is a schematic diagram of the basic bridge circuit.

The output of the bridge circuit is taken across terminals $V_{o_1}$ and $V_{o_2}$, see FIG. 12D, and represents the difference between the voltage from each section. As illustrated in FIG. 12B, the output is sinusoidal-like in shape and when applied to the short spot amplifier 25 causes the amplifier to be unbalanced providing a differentiated output signal at terminals 132 and 133, as illustrated in FIG. 12C which is illustrated with unity gain. The output signal appearing at terminal 132 has a large negative going pulse with a small positive rise at the leading and trailing edge. The signal is applied to the input of Schmitt trigger 27 which is a conventional level sensitive stage adapted to be triggered by a negative incoming pulse of a magnitude determined by the threshold level setting of the Schmitt trigger. A similar output signal, but reversed 180° in phase, appears at terminal 133. The signal from terminal 133 generated by a dark spot crossing the photo-conductive cell at the first viewing station may be terminated at a convenient test point. The corresponding signal appearing at terminal 133 generated by an image crossing the photo-conductive cell at the second viewing station is applied to Schmitt trigger 36 while the signal reversed in phase appearing at terminal 132 may be terminated at a convenient test point. The reason for this will be apparent from the following description.

At the first viewing station, as a strip 12 is imaged on the photo-conductive cell 80, a dark spot first crosses section 81 and then section 82. This gives rise to a large negative pulse at terminal 132 and a large positive pulse at terminal 133. It will be recalled that at the first viewing station the strip is being viewed from the trailing edge, while at the second viewing station the strip is being viewed from the leading edge. Thus, at the second viewing station, an image of the dark spot corresponding to the image projected in the first viewing station crosses section 82 of the photo-conductive cell first and then section 81. This results in an output signal which corresponds to the signal from the first viewing station, but reversed therefrom by 180°. Thus, at the second viewing station, the output signal at terminal 132 is a large positive going pulse while the output signal at terminal 133 is a large negative pulse. Since the Schmitt triggers are triggered by an incoming negative going signal above a certain level, the input to Schmitt trigger 26 from the second viewing station is taken from terminal 133.

Referring to FIG. 13, the long spot amplifier 24 receives an input signal through conductor 140 and capacitor 141, the signal being derived from the average value of the output of the two bridge sections 81 and 82 since the large dark spot will appear across both sections of the photoconductive cell. Amplification of the input signal is effected through three stages 142, 143, and 144. The first stage 142 includes a pair of balanced field effect transistors 145 and 146 biased for conduction by resistors 147 and 148 which return the drain electrodes to ground and resistor 149 which connects the source electrodes of transistors 145 and 146 to the D.C. supply buss. The gate electrode of transistor 145 is connected to the junction of series resistors 150 and 151 connected at the opposite ends to the positive supply buss and ground, while the gate electrode of transistor 146 is connected to the movable arm of balancing potentiometer 152 which is connected in series between resistors 153 and 154, the series branch being connected in turn across the positive supply.

Operation of stage 142 of the long spot amplifier is similar to that of stage 92 of the short spot amplifier 25, but due to the long time response of stage 142, the 120 cycle modulation compensating circuitry is omitted. The response time of stage 142 is such that the circuit is only responsive to large blemishes or long spots.

The output of the first stage 142 is taken across the drain electrodes of transistors 145 and 146 and directly coupled as a differential input to the second stage 143 through conductors 155 and 156. The second stage includes a pair of NPN transistors 157 and 158 having their emitters grounded through common resistor 159 and their collectors returned to the positive supply buss through resistors 160 and 161. The output of the second stage 143 is taken from the collector electrodes and transmitted to a complementary balanced pair of PNP transistors 162 and 163 forming the third stage 144 so as to minimize temperature drift. Capacitors 164 and 165 connected between the base electrodes of transistors 162 and 163 and the positive supply buss provide a narrow low pass filter to reduce noise output from the long spot amplifier 24 and the transistor pair is conventionally biased by common emitter resistor 166 connected to the positive supply buss and collector resistors 167 and 168 connected to ground. A feed back path is formed by a voltage divider comprising resistors 169 and 170 connected from the positive supply buss to the collector electrode of transistor 163 and a feed back resistor 171 connected between the junction of resistors 169 and 170 and the gate electrode of field effect transistor 146. The output from the long spot amplifier 24 is taken from the collector of transistor 162 and applied through conductor 172 to the input of long spot Schmitt trigger 26.

Schmitt triggers 26 and 27 provide level selection and pulse shaping in a well known manner and their outputs are applied as hereinbefore described to the first memory cell of a conventional 72 bit shift register 28 which stores the individual inputs in the memory cells and shifts them to the next succeeding stage upon receipt of a shift command pulse from the pulse generator 29. The Schmitt triggers 26, 27 and 31, shift register 28 and pulse generator 29 which provides an output pulse for each predetermined increment of belt travel which may be, for example, ½ inch are conventional items which operate in a manner well known in the art. Therefore, no detailed description of them will be given.

Those memory cells which have a signal stored corresponding to a defect in the viewed strip are switched by the shift pulse to store the pulse in the next succeeding stage. Storage may be conveniently effected by energizing the stages between a one and a zero state. Those stages initially energized in the zero state are not switched by the shift pulse so that a following stage will be set to a one state if, and only if, the previous stage was in the one stage before the shift pulse occurred. The pattern of ones and zeroes is therefore moved one stage by each shift pulse, the first stage being set to a one state by an appropriate input at any time between shift pulses corresponding to a defect signal received from Schmitt triggers 26 and 27.

The second viewing station is identical to the first viewing station and provides an output signal corresponding to a defect on each strip, but delayed with respect thereto by an amount corresponding to the time of travel of the strip between viewing stations. Thus, the output from the second viewing station triggers the corresponding Schmitt trigger which provides an output pulse to the appropriate memory cell in the shift register so as to compensate for the distance the strip has traveled between the first and second viewing stations. The output of the shift register 28 is translated to the cutter driver 40 for actuation of the cutting blades of the rotary cutter 38. Cutter driver 40 is a conventional driving circuit which includes a pair of SCR switches (not shown) in series with the solenoid coil. The gate electrode of one SCR is conventionally connected to the output of One Shot 39 to energize the solenoid in response to an output pulse therefrom, while the gate electrode of the other SCR is connected to the output of the last stage (N) of the shift register to deenergize or turn off the solenoid. In order to remove a defective center piece from a strip, the number of blades extending from the rotary cutter 38 must be one greater than the number of defects stored in the memory cells. Advantageously, the cutter blades are solenoid actuated and the solenoid is energized or held on so as to cause at least two blades to be extended, depending on the size of the defect.

The cutter driver must be commanded OFF as well as ON. Outputs from the N–2 and N–1 stages turn the cutter ON, while the output from the last stage N turns the cutter OFF. One-shot multivibrator 39 advantageously provides a 10-micro second delay which insures that an ON pulse, if present, occurs shortly after the OFF pulse in the event of multiple adjacent defects to prevent deenergization of the solenoid. Since there is one blade per shift pulse, the number of blades extended exceeds the numbers of "ones" in the shift register sequence by one.

Figure 16A:
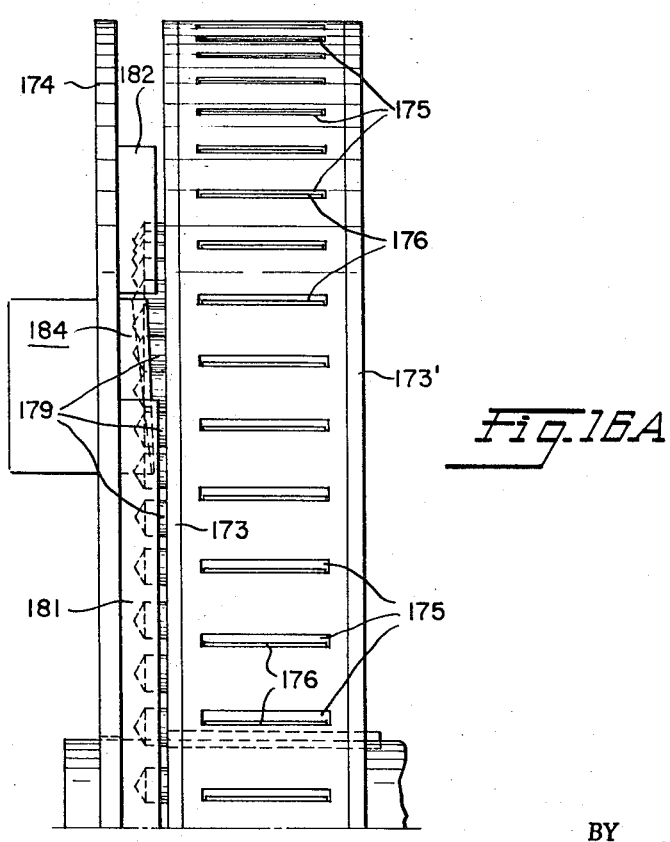
FIG. 16A is a fragmentary view of the rotary cutter.

Referring to FIGS. 15, 16, and 16A the rotary cutter 38 comprises a drum formed by two hollow discs 173 and 173', and is rotatably driven from head pulley 15 with timing belts such that the peripheral velocity equals the conveyor belt speed. The periphery of the drum is provided with a plurality of axial slots 175 formed between guide members 175', one slot being provided for each cutting blade through which the cutting edge of the blades may be extended and which serve to guide the stroke of each blade. In one form thereof, the cutter includes 60 extendable blades 176 which are arranged radially between a pair of annular concentric ridges 177 and 178 extending axially inward from disc 173. The blades rotate with the drum, normally being in a retracted position, and are cam actuated to their extended cutting position.

To this end, each blade 176 carries a pin 179 which is integral therewith and extends axially through a radially extending guide slot 180 in disc 173. The outer end of pin 179 engages a cam track formed by two arcuate cam sections 181 and 182 on an adjacent stationary disc 174. Each pin normally rides along the inner surface of cam section 182 as the cutter is rotated until it reaches the end portion 183. At this point, depending on the position of actuator 184, the pin is caused to ride along either the inner or the outer surface of cam section 181. Cam section 181 has a gradually increasing radius so that when the pin 179 engages the outer surface, the corresponding blade 176 is gradually extended outward until the pin engages the outer extremity of slot 180 which forms a stop and limits blade travel. Upon continued rotation of the cutter 38, pin 179 is positively returned to the inner cam surface of section 182 after it passes the cutting position. Section 182 is displaced outwardly from the end of section 181 as at 183 to permit transfer of the pin to the inner surface of the cam section.

As more clearly shown in FIG. 16, actuator 184 comprises a transfer switching mechanism which is movably mounted on disc 174 and arranged to guide the pins 179 to the inner or outer cam surfaces of cam section 181. Actuator 184 includes a conventional rotary solenoid energized in response to signals from the cutter driver 40. Upon energization of the actuator solenoid, the actuator or transfer switching mechanism 184 is rotated clockwise and is caused to engage the next pin 179 approaching the pointed tip of cam section 181 and guide it to the outer surface thereof 181. If no signal is present to energize the actuator solenoid, the actuator guides the pins to the inner surface of cam section 181 so that the blade 176 remains within the drum during its travel past the cutting position, and the pin is then returned by the inner surface of cam section 182.

Advantageously, actuator 184 may comprise a disc having a section cut away to provide opposed cam surfaces 185, 186 representing the walls of a Y-shaped groove 187 for receiving the tapered end of the pins 179. The pins are tapered at this end to prevent jamming and facilitate their transfer by cam surface 185 or 186 to one or the other surface of cam section 181. As a pin approaches the actuator, the actuator will be positioned in response to the presence or absence of signals from the shift register to cause the pin to be engaged by one or the other of the cam surfaces 185, 186 and be transferred to the appropriate cam surface of section 181.

As hereinbefore described, the rotary cutter is energized at a point ahead of where the strip is to be cut by a signal from the shift register which causes the proper blades to be gradually moved outward to their full extended position. As the strip passes under the cutter wheel, the extended blades 176 engage the strip and cut out the defective section or cut the entire strip into cubes if it has defects extending from one end to the other. The number of blades extended depends upon the signals received from the shift register and a minimum of two blades will be extended upon each cutting action.

Referring to FIG. 14, there is illustrated diagrammatically the output logic circuit for energizing the cutter solenoid. Each of the last three memory cells of the shift register 28 are illustrated, the last cell being designated by reference character N, the next-to-last cell or 71st bit being designated by reference character (N–1) and the preceding stage corresponding to the 70th bit being designated by reference character (N–2). Input signals or bits corresponding to a defect in the strip are received at line R and each memory cell is shifted automatically, in the manner hereinbefore described, by shift pulses arriving at line S. In order that the cutter solenoid be held on to extend at least two blades, outputs of cells (N-2) and (N-1) are both applied through one shot multivibrator 39 to give two successive ON commands to the cutter driver. One command is generated when a signal appears at (N-2) and the second when the signal is shifted by pulse to (N-1). The OFF command for deenergizing the solenoid is generated when the signal is again shifted by the pulse to cell N. To prevent cell N from turning off the cutter when signals occur at the same time in (N-1) or (N-2) cells, or both, the ON command from these cells is given a delay of about 10 microseconds by the one-shot multivibrator, thus arriving at the cutter driver after the OFF command but soon enough to prevent any effective deenergization of the solenoid actuator.

After the strips pass the rotary cutter, the cubes may be separated from the long strips by a conventional short piece separator consisting of a shaker bed (not shown) with appropriate sized holes, and the cubes with defects may be separated from the good cubes by a conventional sorter. If desired, a rejection mechanism consisting of an actuator which pushes the cubes into a separate lane just as the blades have completed their cut may be positioned immediately following the rotary cutter. The lanes of defective cubes can then be gathered separately at the end of the conveyor belt leaving only good cubes to be removed by the short piece separator.

FIGS. 17A-17C and 18A-18B illustrate one form of plow adapted for use with the present invention to effect turn-over of the strips between viewing stations. Plow 19 comprises a guide member 190 and turn-over member 191 adapted to be positioned to form a strip trackway therebetween. Guide member 190 includes a bowed plate 192 having a lip 193 which is provided with a threaded boss 194 to facilitate attachment to a transverse support (not shown). Member 191 is similarly supported adjacent guide member 190, but spaced therefrom by threaded boss 195 on lip 196. To effect turn-over of the strip, member 191 includes a cam surface 197. As a strip is carried by the belt between members 190 and 191, the strip rides up the cam surface 197 until it flips 90° and is positioned against the guide plate 192 prior to its entry to the second viewing station. The design is such that a minimum of longitudinal slip occurs during turn-over.

FIGS. 19A and 19B illustrate the final positioning guide 198 which may be supported in a position ahead of the cutter 38 to insure that the strips pass directly beneath the cutter blades. Guide 198 includes a pair of spaced wall members 199 and 200 which are connected by cross piece 201. Members 199 and 200 are slanted with respect to the direction of feed to provide a relatively wide opening at one end. The wider opening is disposed to receive the strips, while the gradually diminishing space between the members insures that the strips approach the cutter in their lengthwise position. If desired, the members 199 and 200 may be cut away as at 203 to permit positioning of the guide just below the outermost position of the extended blades of the cutter. Guide 196 is attached to an overhead support in a conventional manner by threaded boss 202 on cross piece 201.

Thus far, the invention has been described with regard to apparatus for processing strip-like materials in a single lane; however, the invention is readily adaptable to process articles in a plurality of lanes simultaneously, as well as articles which are other than substantially square or rectangular in cross-section. For example, where articles are of cylindrical shape, it is only necessary to provide a suitable displacement mechanism between the first and second viewing stations to rotate the article 90° about its axis so that the entire surface area of the article may be viewed. Also, if it is not necessary to view the entire surface area such as where, for example, it is only necessary to view the leading and trailing edges of the article, the turn-over mechanism may be entirely eliminated.

Referring to FIG. 20, there is illustrated a multi-lane embodiment of the present invention comprising table 204 having a feed hopper 10 positioned at one end and adapted to feed articles in separate lanes defined by openings 205 in transverse bar 206. The articles may be initially aligned in a lengthwise orientation by guide bars 207 and 208 and carried past the several operating stations by endless belt 13 in a manner hereinbefore described. Advantageously, rather than providing a separate pair of illuminating lamps for each inspection station in each lane, a single pair of fluorescent lamps 20 and 21 are supported transverse of belt 13 and suitable baffles or enclosures 209 and 210 are provided for each lane to define the inspection stations. The articles in each lane are processed in the manner hereinbefore described and the several lanes may feed directly to a cross-belt 211 adapted to deliver the article to a further processing station.

There is thus provided by the present invention apparatus for the automatic inspection and removal of defects from strip materials. Although the invention has been described with reference to only one embodiment thereof, it will be readily apparent to those skilled in the art that various modifications may be made without departing from the inventive concept. It is therefore intended by the appended claims to cover all such modifications which fall within the full scope of the basic invention as defined and set forth in the claims.

What is claimed is:

1. Apparatus for processing strip-like articles comprising a conveyor arranged to receive and convey articles, electro-optical means disposed along the path of travel of said articles for viewing and projecting an image of each article and including means responsive to the projected image for generating electrical signals corresponding to the size of irregularities on the basis of shade variations on each article, storage means connected to said electro-optical means for storing said electrical signals while said articles are carried by said conveyor away from said electro-optical means, first means disposed along the path of travel of the articles away from said electro-optical means for separating from each article portions of the article containing said shade variations, and second means for actuating said first means in response to a read out of said stored electrical signals to effect said separation.

2. Apparatus for the processing of strip-like articles as set forth in claim 1 wherein said electro-optical means includes a first projection assembly for viewing two adjacent sides and one edge of each article and a second projection assembly for viewing the two opposite adjacent sides and the other edge of each article and further including turn-over means disposed between said first and said second assemblies for rotatably shifting each article about its longitudinal axis.

3. Apparatus for processing of strip-like articles as set forth in claim 2 wherein each of said first and said second projection assemblies are positioned to view each article along a line of sight 45° with respect to a vertical plane corresponding to the longitudinal axis of the article and 45° with respect to a vertical plane normal to the direction of travel of said article, said assemblies being in opposed viewing positions with respect to each other.

4. Apparatus for detecting shade variations in strip-like articles comprising a conveyor arranged to receive and convey the articles, a first electro-optical viewing assembly disposed along the path of travel of said articles, for viewing two adjacent sides and one edge of each article, a second electro-optical viewing assembly disposed further along the path of travel of said articles for viewing the two opposite adjacent sides and the other edge of each article, turnover means disposed between said first and said second electro-optical assemblies for rotatably shifting each article about its longitudinal axis, each of said first and second electro-optical assemblies including a photo-conductive cell having a first and a second section and an electrical circuit including said photo-conductive cell for generating electrical signals in response to the average and the differential changes in resistance of the cell, and means for projecting a moving image of each article across each of said sections of each photo-conductive cells such that said first electro-optical assembly generates said signals in response to shade variations appearing on said two adjacent sides and one edge and said second electro-optical assembly generates said signals in response to shade variations appearing on said two opposite sides and the other edge.

5. Apparatus for detecting shade variations in strip-like articles as set forth in claim 4 wherein said electrical circuit comprises an electrical bridge having the sections opposite legs to provide a first output voltage in response to the relative change in resistance value in each section of said photo-conductive cell and a second output voltage in response to the average change in resistance value of the photo-conductive cell due to shade variations of the image projected across both sections.

6. Apparatus for detecting shade variations in strip-like articles as set forth in claim 5 further including first amplifier means connected to receive the output of each electrical bridge and being responsive to said first output voltage for generating a first electrical signal and second amplifying means connected to receive the output of each electrical bridge and being responsive to said second output voltage for generating a second electrical signal, said first and second electrical signals corresponding to shade variations on said strip-like materials of a predetermined size, said shade variation corresponding to said first electrical signal being smaller in size than the shade variation corresponding to said second electrical signal.

7. Apparatus for processing strip-like articles comprising a conveyor arranged to receive and convey the articles, electro-optical means disposed along the path of travel of said articles for viewing and projecting an image of each article and including means responsive to the projected image for generating electrical signals corresponding to the size of irregularities on an article, on the basis of shade variations, storage means connected to said electro-optical means for storing said electrical signals including a shift register having a plurality of memory cells, means for sequentially shifting said signals in response to a fixed distance of travel of said conveyor, said last named means comprising a synchronous pulse generator driven by said conveyor and having its output connected to said shift register to effect said sequential shifting, first means disposed along the path of travel of the articles away from said electro-optical means for separating from each article portions of the article containing said shade variations and second means for actuating said first means in response to a read out of said stored electrical signals.

8. Apparatus for processing strip-like articles as set forth in claim 7 wherein said electro-optical means includes a first and a second viewing and projecting assembly, said first assembly being disposed for viewing and projecting the image of two adjacent sides and the trailing edge of each article, said second assembly being disposed for viewing and projecting the image of the two opposite adjacent sides and the leading edge of each article, and means electrically connecting said first and said second assemblies to said shift register such that said signals from said second assembly are stored in said shift register at a point corresponding to the distance of travel of each article between the first and the second assemblies.

9. Apparatus for processing strip-like articles comprising a conveyor arranged to receive and convey the articles, an electro-optical assembly disposed along the path of travel of said articles including a scanning head for viewing each article and projecting a moving image of the article and light sensitive means disposed to receive said projected moving image and generate electrical signals corresponding to the size of irregularities on the basis of shade variations on the viewed article, storage means for storing said electrical signals including a shift register having N memory cells, means for sequentially shifting said electrical signals in response to fixed increments of travel of said conveyor, a cutter driven in synchronism with said conveyor, said cutter being disposed along the path of travel of the articles away from said electro-optical assembly and including a plurality of cutting blades adapted to be selectively actuated between a normally retracted non-cutting position and an extended cutting position and blade actuating means adapted to be energized in response to a read out of the stored signals for selectively actuating said blades to cut-away from each article portions of the article containing said shade variations.

10. Apparatus for processing strip-like articles as set forth in claim 9 wherein said blade actuating means comprises a solenoid operated actuator, a driving stage for energizing the solenoid for displacement of the actuator between a first and second position and means for connecting said driving stage to the shift register to energize said solenoid for displacement of the actuator to its first position in response to command signals from the output of the N memory cell and for displacement of the actuator to its second position in response to the output from at least one preceding memory cell.

11. Apparatus for processing strip-like articles as set forth in claim 9 wherein said blade actuating means comprises a solenoid operated actuator, a driving stage for energizing said solenoid for displacement of the actuator between a first and second position and means for connecting said driving stage to the shift register to cause said soleoid to be energized for displacement of the actuator to its first position in response to an output from the N memory cell and to its second position in response to simultaneous outputs from at least two adjacent preceding memory cells.

12. Apparatus for processing strip-like articles as set forth in claim 11 wherein said means for connecting said driving stage to the shift register includes a delay circuit connected between the driving stage and said two adjacent preceding memory cells to cause the output of said memory cells to override the control function of the output from said N memory cell.

13. Apparatus for processing strip-like articles comprising a conveyor arranged to receive and convey the articles, an electro-optical assembly disposed along the path of travel of said articles including a scanning head for viewing each article and projecting a moving image of the article and light sensitive means disposed to receive said projected moving image and generate electrical signals corresponding to the size of irregularities appearing on an article on the basis of shade variations, storage means for storing said electrical signals including a shift register having N memory cells, means for sequentially shifting said electrical signals in response to fixed increments of travel of said conveyor, a rotary cutter driven in synchronism with said conveyor, said rotary cutter being disposed along the path of travel of the articles away from said electro-optical assembly and including a plurality of cutting blades adapted to be selectively actuated for displacement from a normally retracted non-cutting position to an extended cutting position, a stationary cam member having a first and a second cam surface and blade actuating means adapted to be energized in response to a read-out of the stored signals for selectively positioning said blades for cooperation with one or the other of the said cam surfaces to cause said blades to effect removal from each article the portions of each article containing said shade variations.

14. An electro-optical assembly for generating output signals in response to the size of irregularities on strip-like articles based on shade variations comprising a photo-conductive cell having a first and a second section, optical means disposed to view said strip-like articles and project a moving image of the viewed articles across said sections, an electrical bridge circuit including said photo-conductive cell and having said first and said second sections connected in opposite legs of the bridge circuit and means connected to said bridge for providing output signals dependent on the relative change in resistance value and the average change in resistance value of said sections.

15. An electro-optical assembly for generating output signals in response to the size of irregularities on strip-like articles based on shade variations comprising a photo-conductive cell having a first and a second section, optical means disposed to view said strip-like articles and project a moving image of the viewed articles across said sections, a balanced electrical bridge circuit having said sections connected in opposite legs and including means for providing separate output signals corresponding to the size of an irregularity on an article in response to the output voltage produced across said bridge due to the relative change in resistance value in each leg and to the output voltage produced across said bridge in response to the average change in resistance value in each leg.

16. An electro-optical assembly for generating output signals in response to the size of irregularities on strip-like articles as set forth in claim 14 wherein said means to provide separate output signals includes a first amplifier for generating electrical signals in response to defects on said articles less than ¼ inch in diameter and a second amplifier for generating electrical signals in response to defects on said articles greater than ¼ inch in diameter.

17. An electro-optical assembly for generating an output signal in response to an irregularity of predetermined size on strip-like articles based on shade variations comprising a photo-conductive cell having two sections of photo-conductive material, each section including alternately spaced high resistance areas and low resistance areas, a balanced electrical bridge circuit including said sections connected in opposite legs of the bridge, optical means for viewing said strip-like articles and projecting an image of the viewed strip-like articles across said sections and means responsive to the difference in resistance value of each section due to a shade variation of the image covering one section and not the other for providing an output signal corresponding to said shade variation.

18. An electro-optical assembly for generating output signals in response to the size of irregularities on strip-like articles based on shade variations comprising a photo-conductive cell having two sections of photo-conductive material, each section including alternately spaced high resistance areas and low resistance areas, a balanced electrical bridge circuit including said sections connected in opposite legs of the bridge circuit, optical means disposed to view said strip-like articles and project an image of the viewed strip-like articles across said sections, first means responsive to the difference in resistance value of each section due to a shade variation of the image covering one section and not the other to provide an output signal corresponding to the shade variation and second means connected across said bridge circuit for providing an output signal in response to the average resistance value of both sections due to a shade variation of the image covering both sections.

19. Apparatus for processing strip-like articles and selectively separating portions of the articles containing irregularities based on shade variations comprising a conveyor arranged to receive and convey the articles past a plurality of operating stations, means disposed along the path of travel of said articles for viewing each article and projecting a moving image of the article, a light sensitive element disposed to receive the projected moving image, said light sensitive element comprising a differential photo-conductive cell for comparing the average and differential change in resistance value of the cell in response to shade variations on the articles, a bridge circuit including said light sensitive element connected to provide an output signal in response to shade variations on the articles and means responsive to said output signals for separating from each article portions of the article having said shade variations, said means being disposed in the path of travel of said articles away from the viewing means.

20. The method of detecting irregularities in strip-like articles based on shade variations on the articles comprising the steps of: moving the articles within the range of a scanning head, viewing the surface of the articles with said scanning head and projecting a moving image of the articles across a first and a second light sensitive member and electronically comparing the resistance of one light sensitive member with the other to provide an output signal in response to the size of shade variations on the viewed surface.

21. The method of detecting irregularities in strip-like articles based on shade variations thereon comprising the steps of: moving the articles within the range of a scanning head, viewing the surface of the articles with said scanning head and projecting a moving image of the articles across a first and a second light sensitive member and electronically comparing the average and differential change in resistance value of the light sensitive members to provide output signals in response to the size of shade variations on the viewed surface.

22. The method of detecting irregularities in strip-like articles as set forth in claim 21 further including the steps of storing in a memory register the output signals corresponding to said shade variations and retrieving the output signals upon a fixed distance of travel of said articles past the area in which they are viewed.

23. The method of detecting irregularities in strip-like articles as set forth in claim 21 further including the step of separating from each article a portion of the articles containing the shade variations in response to said output signals.

24. The method of detecting irregularities in strip-like articles and selectively processing the strip-like articles containing the irregularities based on shade variations comprising the steps of: continuously moving the articles past a plurality of operating stations, viewing a first portion of the surface of the articles and projecting a moving image of the viewed portion across a first pair of light sensitive members, electronically comparing the average and differential change in resistance value of the light sensitive members to provide output signals in response to the size of shade variations on the first viewed portion, viewing a second portion of the surface of the articles and projecting a moving image of the viewed second portion across a second pair of light sensitive members, comparing the average and differential change in resistance value of the second pair of light sensitive members to provide output signals in response to the size of shade variations on the second portion of the viewed surface and separating from each article portions of the article containing the shade variations in response to said output signals corresponding to the viewed portions of the surface.

25. Apparatus for detecting shade variations in strip-like articles and selectively processing portions of the strip-like articles on the basis of said shade variations comprising a conveyor arranged to receive and convey the articles, electro-optical means disposed along the path of travel of said articles for viewing each article and generating electrical signals in response to the size of shade variations on said articles, and means responsive to said electrical signals for separating from each article portions of the article containing the shade variations, said electro-optical means disposed along the path of travel of said strips for viewing each article including a photo-conductive cell having a first and a second section, means for projecting a moving image of the viewed article across said sections and an electrical circuit including said photo-conductive cell sections for generating said signals in response to the average and differential change in resistance of the cell.

26. Apparatus for the processing of strip-like articles as set forth in claim 25 wherein said electro-optical means includes two like viewing assemblies, one of said assemblies being disposed for viewing two adjacent sides and one edge of each article, the other of said assemblies being disposed for viewing the two opposite adjacent sides and the other edge of each article and further including turnover means disposed between said first and said second assemblies for rotatably shifting each article about its longitudinal axis.

27. Apparatus for detecting shade variations in strip-like articles and selectively processing portions of the strip-like articles on the basis of said shade variations comprising a conveyor arranged to receive and convey the articles, optical means disposed along the path of travel of said articles for viewing and projecting an image of each article, a photo-conductive cell positioned in the path of the projected image, circuit means for generating electrical signals in response to the size of shade variations on said articles, storage means for storing said electrical signals while said articles are carried by said conveyor away from said photo-conductive cell, first means disposed along the path of travel of the articles away from said photo-conductive cell for separating from each article portions of the article containing said shade variations, and second means for actuating said first means in response to a read out of said stored electrical signals to effect said separation.

28. Apparatus as set forth in claim 27 wherein said photo-conductive cell includes a first and a second section and said circuit means includes an electrical bridge, said first and second sections being connected in opposite legs of the bridge.

References Cited

UNITED STATES PATENTS

| | | | |
|---|---|---|---|
| 2,753,464 | 7/1956 | Stone | 250—219 |
| 2,565,727 | 8/1951 | Henderson | 250—223 |
| 3,289,832 | 12/1966 | Ramsay | 209—111.7 |

ARCHIE R. BORCHELT, Primary Examiner

M. ABRAMSON, Assistant Examiner

U.S. Cl. X.R.

146—89; 250—219, 222